(12) United States Patent
Kraus et al.

(10) Patent No.: US 9,624,833 B2
(45) Date of Patent: Apr. 18, 2017

(54) COMPRESSOR COMPRISING A STATOR VANE ASSEMBLY HAVING AN INNER RING AND A SEAL CARRIER SECURED THERETO WITH A CLAMPING ELEMENT

(71) Applicant: MTU Aero Engines GmbH, Munich (DE)

(72) Inventors: Juergen Kraus, Karlsfeld (DE); Felix Kern, Eching (DE)

(73) Assignee: MTU Aero Engines GmbH, Munich (DE)

( * ) Notice: Subject to any disclaimer, the term of this patent is extended or adjusted under 35 U.S.C. 154(b) by 883 days.

(21) Appl. No.: 13/784,192

(22) Filed: Mar. 4, 2013

(65) Prior Publication Data
US 2013/0230388 A1 Sep. 5, 2013

(30) Foreign Application Priority Data
Mar. 5, 2012 (EP) .................................... 12001501

(51) Int. Cl.
*F01D 11/00* (2006.01)
*F02C 7/28* (2006.01)
*F01D 9/04* (2006.01)

(52) U.S. Cl.
CPC ................. *F02C 7/28* (2013.01); *F01D 9/04* (2013.01); *F01D 11/001* (2013.01)

(58) Field of Classification Search
CPC ...... F01D 11/02; F01D 11/005; F01D 11/003; F01D 11/001; F01D 9/04; F01D 17/162; F01D 9/02; F01D 9/042

USPC ...... 415/173.7, 173.1, 170.1, 160, 159, 161, 415/162, 173.5, 174.5
See application file for complete search history.

(56) References Cited

U.S. PATENT DOCUMENTS

| | | | | |
|---|---|---|---|---|
| 4,630,994 | A * | 12/1986 | Gross | F01D 11/08 403/358 |
| 6,129,512 | A * | 10/2000 | Agram | F01D 17/162 415/160 |
| 8,376,692 | B2 | 2/2013 | Stiehler | |
| 2006/0056963 | A1 | 3/2006 | Adabie et al. | |
| 2010/0272559 | A1 * | 10/2010 | Propheter-Hinckley | F01D 11/005 415/173.1 |

FOREIGN PATENT DOCUMENTS

| | | |
|---|---|---|
| DE | 102007015669 | 10/2008 |
| EP | 1635039 | 3/2006 |

(Continued)

*Primary Examiner* — William H Rodriguez
*Assistant Examiner* — Christopher Brunjes
(74) *Attorney, Agent, or Firm* — Davidson, Davidson & Kappel, LLC

(57) ABSTRACT

A compressor having a stator vane assembly having an inner ring and a seal carrier secured thereto, the seal carrier having two opposite seal carrier end faces and the inner ring having two inner ring end faces which face said seal carrier end faces and are received between said seal carrier end faces with an axial gap therebetween, at least one clamping element bearing axially with a first clamping element end face against the inner ring and with a second clamping element end face against the seal carrier and being axially resiliently clamped between the inner ring and the seal carrier. A compressor with a clamping element for radial clamping is also provided.

25 Claims, 14 Drawing Sheets

(56) References Cited

FOREIGN PATENT DOCUMENTS

| EP | 2093380 | 8/2009 |
| WO | WO9316275 | 8/1993 |
| WO | WO 2007/134585 | 11/2007 |
| WO | WO2011045128 | 4/2011 |

* cited by examiner

COMPRESSOR COMPRISING A STATOR VANE ASSEMBLY HAVING AN INNER RING AND A SEAL CARRIER SECURED THERETO WITH A CLAMPING ELEMENT

This claims the benefit of European Patent Application EP 12001501.1, filed Mar. 5, 2012 and hereby incorporated by reference herein.

The present invention relates to a compressor, in particular for an aircraft engine, having a stator vane assembly having an inner ring and a seal carrier secured thereto, a method for securing the seal carrier to the inner ring of such a compressor, and to an inner ring, a seal carrier as well as a clamping element for such a compressor.

BACKGROUND

A compressor having an inner ring to which is secured a seal carrier of a stator vane assembly is known, in particular, from the Applicant's International Patent Application WO 2007/134585 A1, the disclosure and contents of which are fully incorporated in the present patent application by reference.

Due to manufacturing tolerances, there may be an axial gap and/or a radial gap between the inner ring and the seal carrier.

SUMMARY OF THE INVENTION

It is an object of the present invention to provide a compressor having an inner ring and a seal carrier secured thereto.

The present invention provides a compressor, in particular a turbocompressor, preferably a gas turbine compressor, in particular an aircraft engine compressor, has at least one stator vane assembly. If, in a preferred embodiment, the compressor has a plurality of stator vane assemblies, one, several or, in particular, all of the stator vane assemblies may be configured as follows:

A stator vane assembly has an inner ring preferably having stator vanes fixedly or adjustably mounted thereto. In particular, on a side opposite such vanes and/or on a radially inner side of the inner ring, the inner ring has a seal carrier secured thereto which may preferably have a sealing surface, in particular, a rub coating or run-in coating, on the radially inner side thereof. Preferably, the inner ring and/or the seal carrier may be segmented. As is customary in the art, the terms "axial", "radial" and "circumference" are understood herein to refer to a an axis of rotation of the compressor ("axial"), an axis perpendicular to the axis of rotation ("radial"), and a tangential direction perpendicular to the axial and radial directions, respectively.

The seal carrier is preferably detachably secured to the inner ring.

More particularly, in a first aspect of the present invention, the seal carrier has two opposite, in particular parallel seal carrier end faces for axial securement. The inner ring has two inner ring end faces which face said seal carrier end faces and are received between said seal carrier end faces with an axial gap therebetween. More specifically, one inner ring end face may rest against one seal carrier end face, and the other inner ring end face may be disposed axially opposite the other seal carrier end face and spaced therefrom by the axial gap.

Specifically, in order to secure the seal carrier to the inner ring without axial play, one or more clamping elements, which are preferably distributed, in particular equidistantly distributed, around the circumference, are axially resiliently clamped between the inner ring and the seal carrier.

To this end, the clamping element or elements preferably bears/bear axially with a first clamping element end face against a counter end face of the inner ring, in particular a shoulder or a bottom of a recess in the inner ring end face, and with a second clamping element end face against a counter end face of the seal carrier, in particular a seal carrier end face.

Preferably, the sum of the, in particular, maximum axial distance between these two clamping element end faces of the undeformed or non-clamped clamping element and the, in particular, maximum axial distance between the counter end face of the inner ring and the inner ring end face that is more distant from the counter end face of the seal carrier is greater than the, in particular, maximum axial distance between the two seal carrier end faces.

Thus, if in a preferred embodiment, a clamping element is partially received within a recess in an inner ring end face and bears axially against the bottom or a shoulder of the recess therewithin, the bottom or shoulder therefore defining a counter end face of the inner ring, then the undeformed or non-clamped clamping element projects from this recess by more than the axial play beyond the inner ring end face, and is axially resiliently compressed when the inner ring having the clamping element inserted therein is received between seal carrier end faces.

In one embodiment, one or more clamping element end faces each have an entry ramp against the axial direction. An entry ramp against the axial direction is understood to be, in particular, a surface whose axial distance from a normal plane perpendicular to the axial direction increases in the circumferential direction, so that rotation of the entry ramp in the circumferential direction about the axis of rotation reduces its axial distance in a plane in which lies the axial direction. Accordingly, the axial distance of such an entry ramp of a clamping element from a counter end face of the seal carrier decreases when rotating the clamping element in the circumferential direction about the axis of rotation, so that such rotation causes the clamping element to be increasingly clamped in the axial direction. An entry ramp of a clamping element against the axial direction may, in particular, be formed by a bevel of circular cross section.

One or more of the above-mentioned end faces, in particular an inner ring end face and/or a seal carrier end face, a clamping element end face and/or a counter end face preferably has a surface normal to the axial direction and is preferably a surface normal to the axial direction.

In a second aspect of the present invention, the seal carrier additionally or alternatively has a two opposite, in particular parallel seal carrier peripheral surfaces, in particular for radial securement. The inner ring has two inner ring peripheral surfaces which face said seal carrier peripheral surfaces.

In one embodiment, the seal carrier peripheral surfaces are received between the inner ring peripheral surfaces with a radial gap therebetween. Conversely, in another embodiment, the inner ring peripheral surfaces are received between the seal carrier peripheral surfaces with a radial gap therebetween.

More specifically, one inner ring peripheral surface may rest against one seal carrier peripheral surface, and the other inner ring peripheral surface may be disposed radially opposite the other seal carrier peripheral surface and spaced therefrom by the radial gap.

Specifically, in order to secure the seal carrier to the inner ring without radial play, one or more clamping elements, which are preferably distributed, in particular equidistantly distributed, around the circumference, are radially resiliently clamped between the inner ring and the seal carrier.

In order to enable securement without axial or radial play, first clamping elements may be axially resiliently clamped between the inner ring and the seal carrier, and second, different clamping elements may be radially resiliently clamped between the inner ring and the seal carrier. In a preferred embodiment, however, in order to enable securement without any axial or radial play, one or more clamping elements are resiliently clamped between the inner ring and the seal carrier both axially and radially. Thus, in particular, the clamping elements according to the second aspect may also be of the type described hereinbefore with reference to the first aspect.

In order to enable securement without radial play; i.e., to provide radial resilient clamping, the clamping element or elements preferably bears/bear radially with a first clamping element peripheral surface against a counter peripheral surface of the inner ring, in particular within a recess in an inner ring peripheral surface, and with a second clamping element peripheral surface against a counter peripheral surface of the seal carrier, in particular a seal carrier peripheral surface.

Preferably, the sum of the, in particular, maximum radial distance between these two clamping element peripheral surfaces of the undeformed or non-clamped clamping element and the, in particular, maximum radial distance between the second clamping element peripheral surface and the inner ring peripheral surface that faces away from the counter peripheral surface of the seal carrier is smaller than the, in particular, maximum radial distance between the two seal carrier peripheral surfaces.

Thus, if in a preferred embodiment, a clamping element is partially received within a recess in an inner ring peripheral surface and is radially supported therein, this recess defining a counter peripheral surface of the inner ring, then the undeformed or non-clamped clamping element projects from this recess by more than the radial play beyond the inner ring peripheral surface, and is radially resiliently compressed when the seal carrier peripheral surfaces are received between the inner ring peripheral surfaces of the inner ring with the clamping element inserted therein. This applies analogously similarly if, in another embodiment, the inner ring peripheral surfaces are received between the seal carrier peripheral surfaces with a radial gap therebetween.

In one embodiment, one or more clamping element peripheral surfaces each have an entry ramp against the radial direction. An entry ramp against the radial direction is understood to be, in particular, a surface whose radial distance with respect to the axial direction increases in the circumferential direction, so that rotation of the entry ramp in the circumferential direction about the axis of rotation reduces its radial distance in a plane in which lies the axial direction. Accordingly, the radial distance of such an entry ramp of a clamping element from a counter peripheral surface of the seal carrier decreases when rotating the clamping element in the circumferential direction about the axis of rotation, so that such rotation causes the clamping element to be increasingly clamped in the radial direction. An entry ramp of a clamping element against the radial direction may, in particular, be formed by a circular segment-shaped cross section of less than 180°

One or more of the above-mentioned peripheral surfaces, in particular an inner ring peripheral surface and/or a seal carrier peripheral surface, a clamping element peripheral surface and/or a counter peripheral surface preferably has a flat surface and/or a curved surface and preferably has a circular segment-shaped outer contour in a cross section normal to the axial direction.

In one embodiment of the present invention, one or more clamping elements are each partially received, in particular along a portion of their axial length and/or a portion of their circumference, within a recess in an inner ring end face and/or an inner ring peripheral surface, said recess being open at one end; i.e. configured like a blind hole.

In one embodiment of the present invention, the seal carrier is secured to the inner ring in a position that is rotated with respect to the mounting position; a seal carrier end face having one or more through-holes for insertion of at least one clamping element into a recess which, in the mounting position, is in alignment with the through-hole and, in the rotated position, is closed by the seal carrier end face.

In one embodiment of the present invention, one or more clamping elements have one or more shoulders. Such a shoulder may, in particular, be defined between two axially spaced-apart cross sections which have different radial dimensions and/or distances from the axis of rotation.

In one embodiment of the present invention, one or more clamping elements have one or more circular and/or rectangular cross sections.

According to a another aspect of the present invention, one or more clamping elements are resiliently clamped between the seal carrier and the inner ring when securing the seal carrier to the inner ring.

In particular, in a mounting position, the clamping element or elements may be partially inserted into recesses of an inner ring end face through through-holes, whereupon the seal carrier and the inner ring may be rotated relative to each other and secured to each other, thereby radially and/or axially resiliently clamping the clamping element or elements between the seal carrier and the inner ring.

BRIEF DESCRIPTION OF THE DRAWINGS

Further advantages and features will become apparent from the dependent claims and the exemplary embodiments. To this end, the drawings show, partly in schematic form, in:

DETAILED DESCRIPTION

Figure 1:
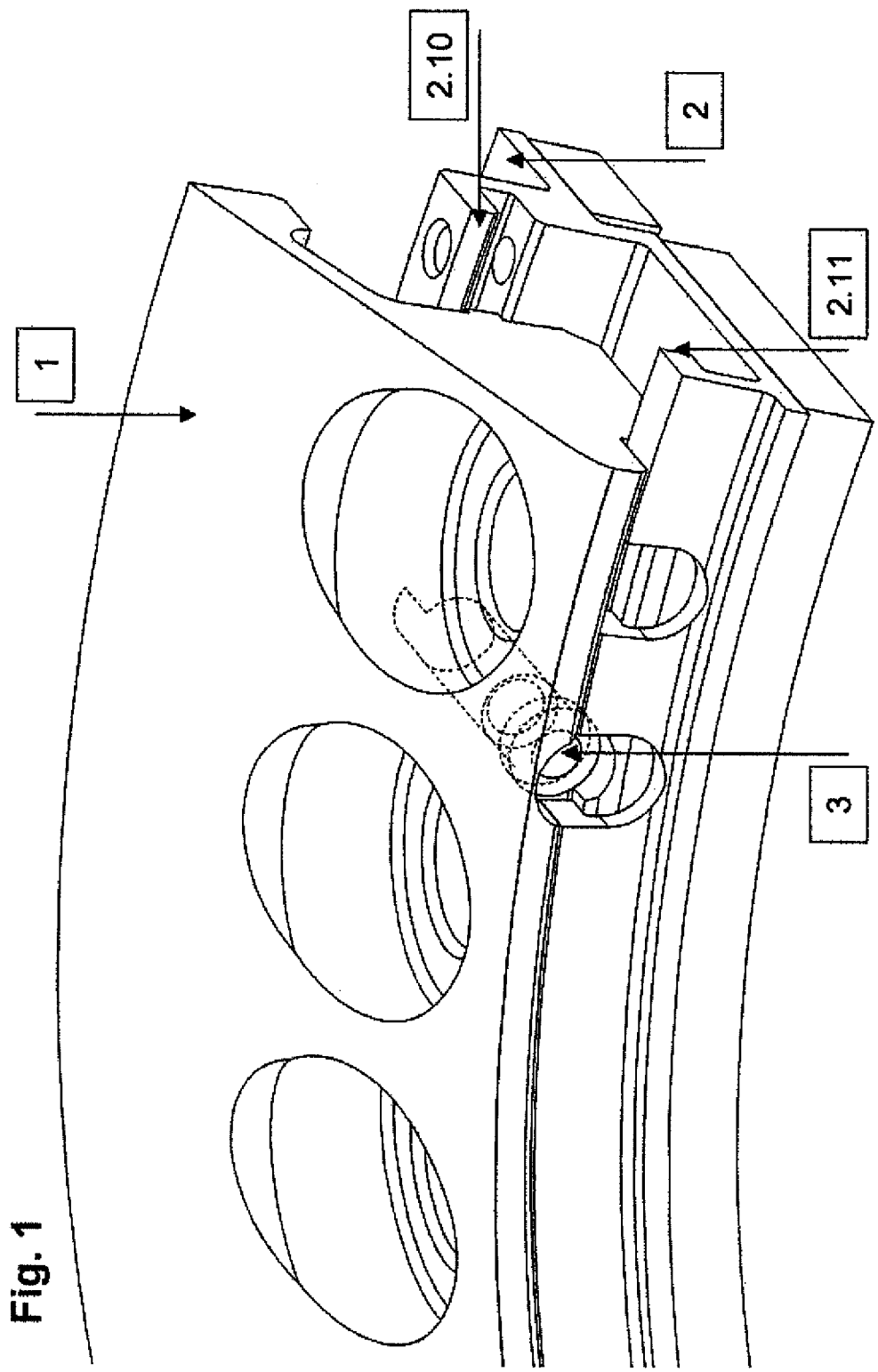
FIG. 1: a perspective view showing a portion of a stator vane assembly of a compressor according to one embodiment of the present invention in a mounting position.

FIG. 1 shows a perspective view of a portion of a stator vane assembly of a compressor according to one embodiment of the present invention in a mounting position, the stator vane assembly including an inner ring 1 and a seal carrier 2.

The seal carrier has two opposite parallel seal carrier end faces 2.10, 2.11. The inner ring has two inner ring end faces 1.10, 1.11 which face said seal carrier end faces and are received between said seal carrier end faces with an axial gap therebetween.

One or more identically configured clamping elements are distributed around the circumference and received along a portion of their axial length within a recess in inner ring end face 1.11, said recess being open at one end; i.e. configured like a blind hole. FIG. 1 shows only one clamping element 3 of these clamping elements. As can be seen especially in FIG. 3, the clamping element has an axial portion of larger circular cross section, which merges into another axial portion of smaller circular cross section. These portions each have a bevel on their end face facing away from the shoulder. The corresponding recess has corresponding axial portions of corresponding circular cross sections, so that the clamping element can be axially inserted into the recesses, preferably with little radial play therebetween, whereupon its rests with the shoulder and/or the smaller end face against a shoulder and/or the bottom of the recess. In order to allow insertion of the clamping elements, seal carrier end face 2.11 has corresponding through-holes which, in the mounting position shown in FIG. 1, are in alignment with the recesses.

For mounting, first the seal carrier is secured to the inner ring in the mounting position shown in FIG. 1, and the clamping elements are inserted. Then, seal carrier and the inner ring are rotated relative to each other into the end position shown in FIG. 2, thereby axially resiliently clamping the clamping elements between the inner ring and the seal carrier.

To this end, the clamping elements bear axially with their shoulder and/or their smaller end face, which forms a first clamping element end face, against the shoulder and/or the bottom of the recess in inner ring end face 1.11, which forms an opposite end face of the inner ring, and with their larger end face, which forms a second clamping element end face, against seal carrier end face 2.11, which forms an opposite end face of the seal carrier. In this connection, the sum of the maximum axial distance between these two clamping elements end face of the undeformed or non-clamped clamping element; i.e., the maximum axial length of clamping element 3, and the maximum axial distance between the counter end face of the inner ring and the inner ring end face 1.10 that is more distant from the counter end face 2.11 of the seal carrier is greater than the maximum axial distance between the two seal carrier end faces 2.10, 2.11, so that the undeformed or non-clamped clamping element projects from this recess by more than the axial play beyond inner ring end face 1.11, and is axially resiliently compressed when the inner ring and the seal carrier are rotated relative to each other into the end position shown in FIG. 2.

In this connection, the bevel of the larger end cross section (on the left in FIG. 3) forms an entry ramp against the axial direction. Rotation of this entry ramp in the circumferential direction about the axis of rotation reduces its axial distance from counter end face 2.11 of the seal carrier, so that such rotation causes the clamping element to be increasingly clamped in the axial direction. The flat end face between the bevel of the larger end cross section for example can come to rest against counter end face 2.11.

Conversely, in order to remove or axially detach the seal carrier, the inner ring and the seal carrier are rotated relative to each other into the mounting position shown in FIG. 1 until the through-holes and the recesses in inner ring end face 1.11 are in alignment, so that clamping elements 3 can relax and be removed through the through-holes.

Figure 2:
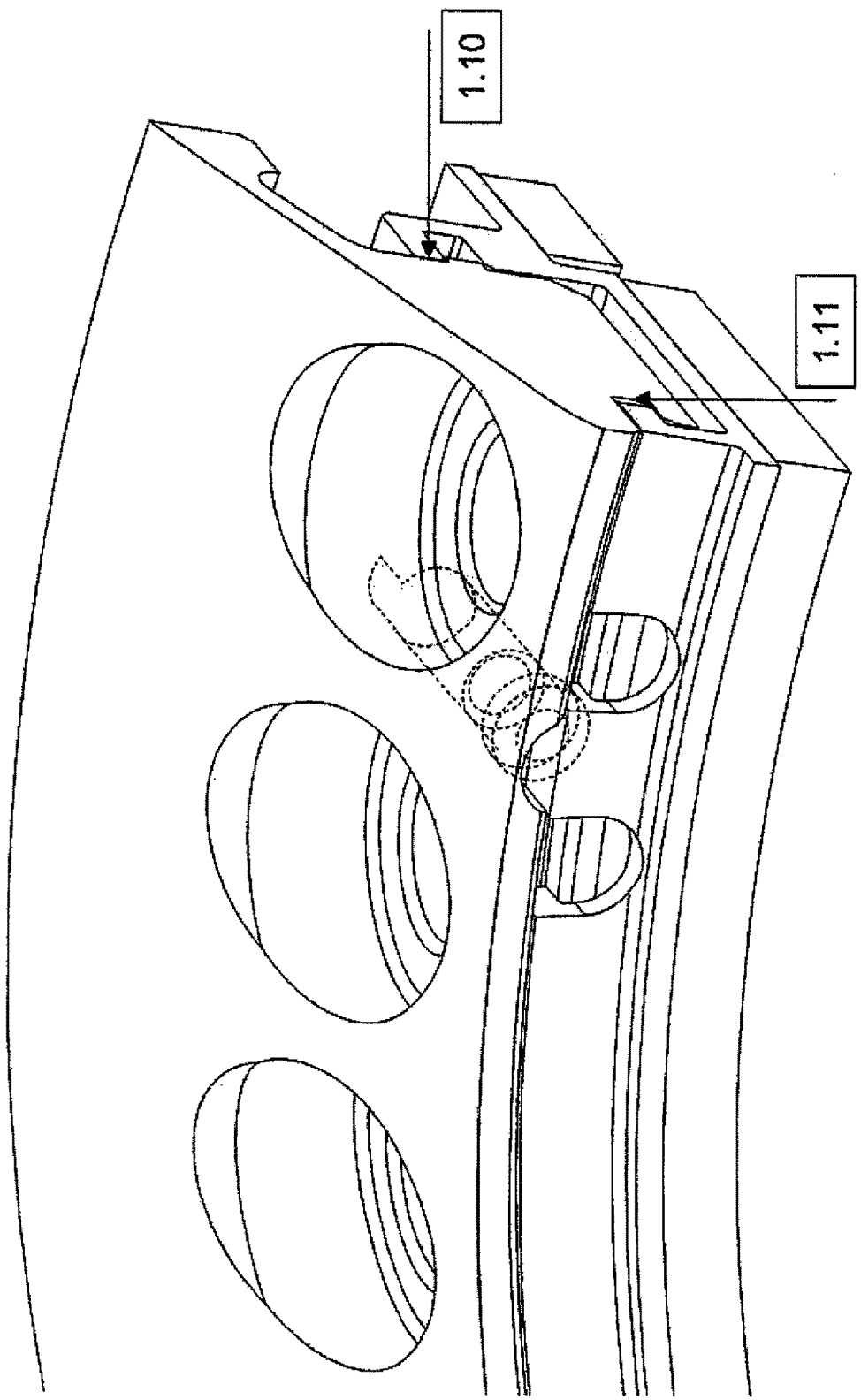
FIG. 2: the portion of the stator vane assembly of FIG. 1 in an end position which is rotated with respect to the mounting position and in which a seal carrier and an inner ring are secured to each other.
Figure 3:
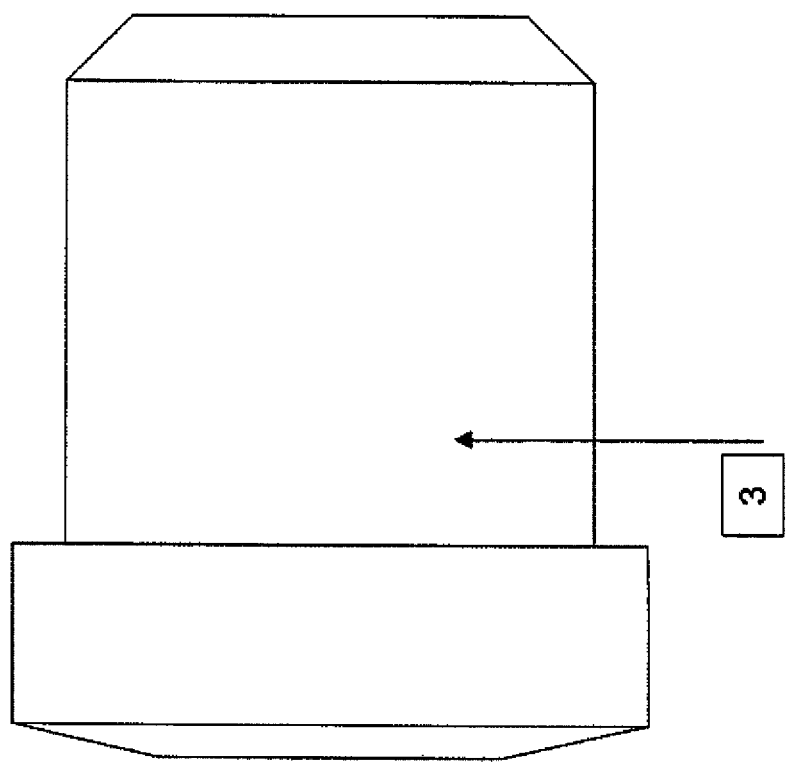
FIG. 3: a side view of a clamping element of the stator vane assembly of FIG. 1.
Figure 4:
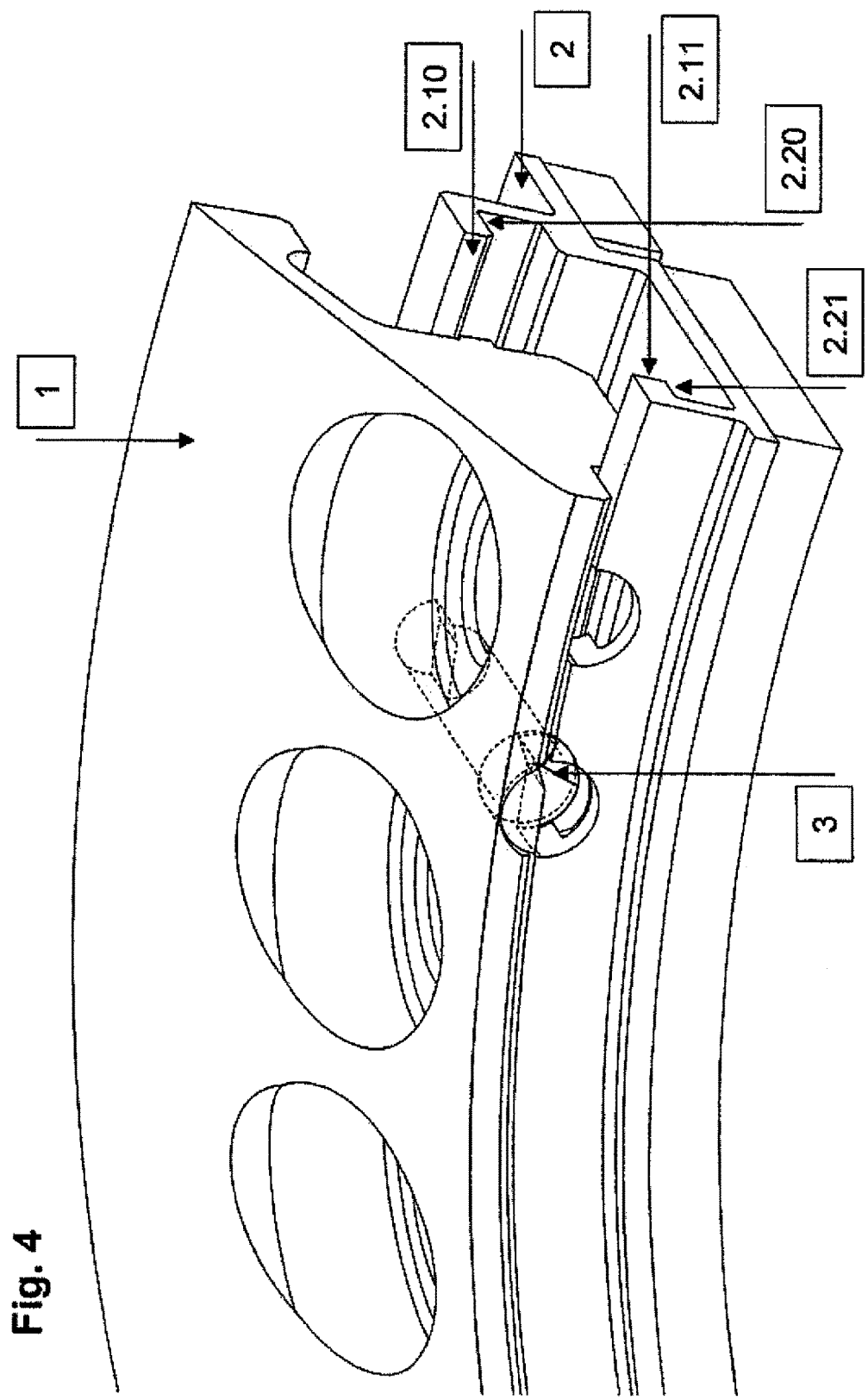
FIG. 4: a portion of a stator vane assembly of a compressor according to another embodiment of the present invention in a view similar to FIG. 1.
Figure 5:
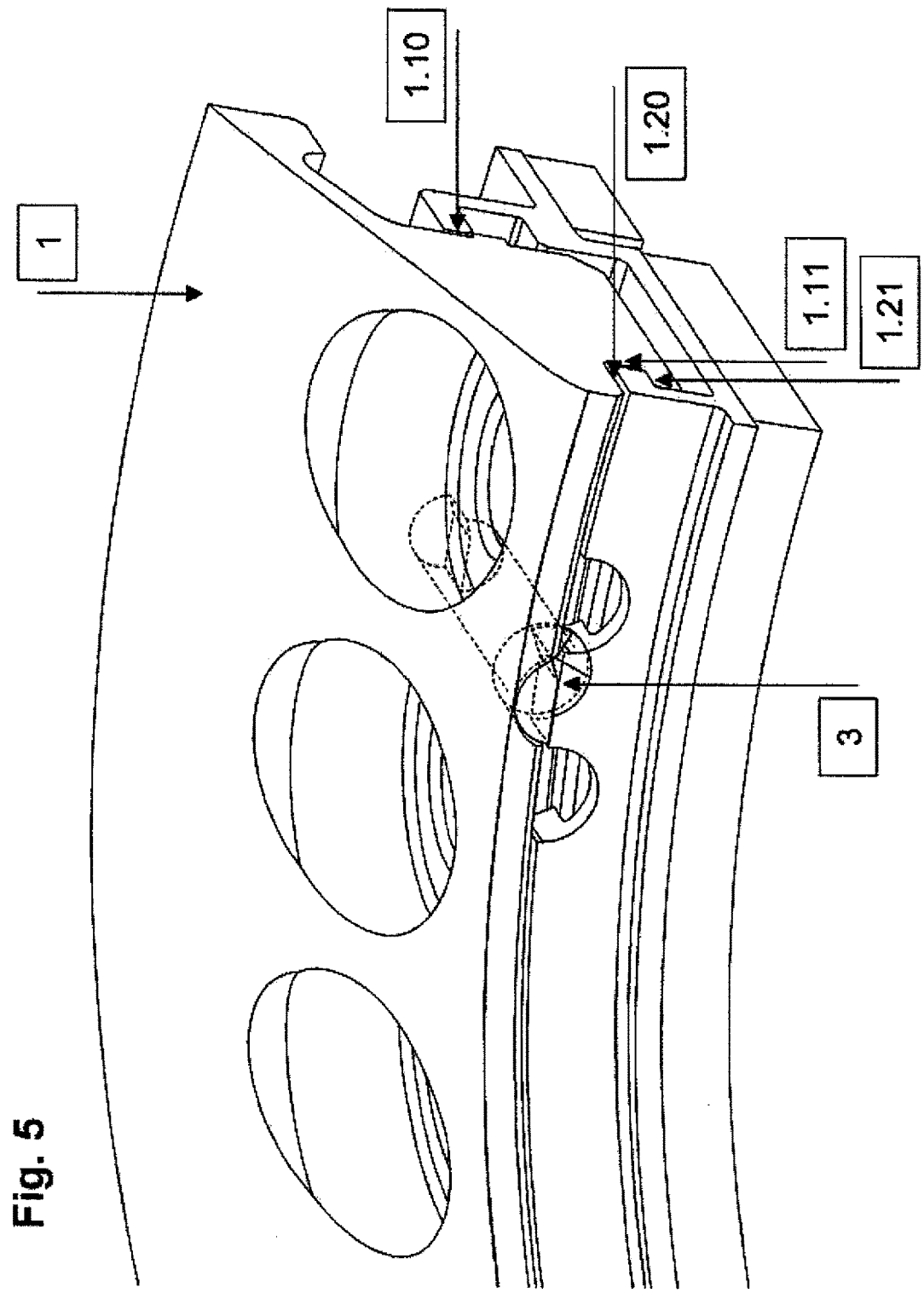
FIG. 5: the portion of the stator vane assembly of FIG. 4 in an end position which is rotated with respect to the mounting position and in which a seal carrier and an inner ring are secured to each other.
Figure 6:
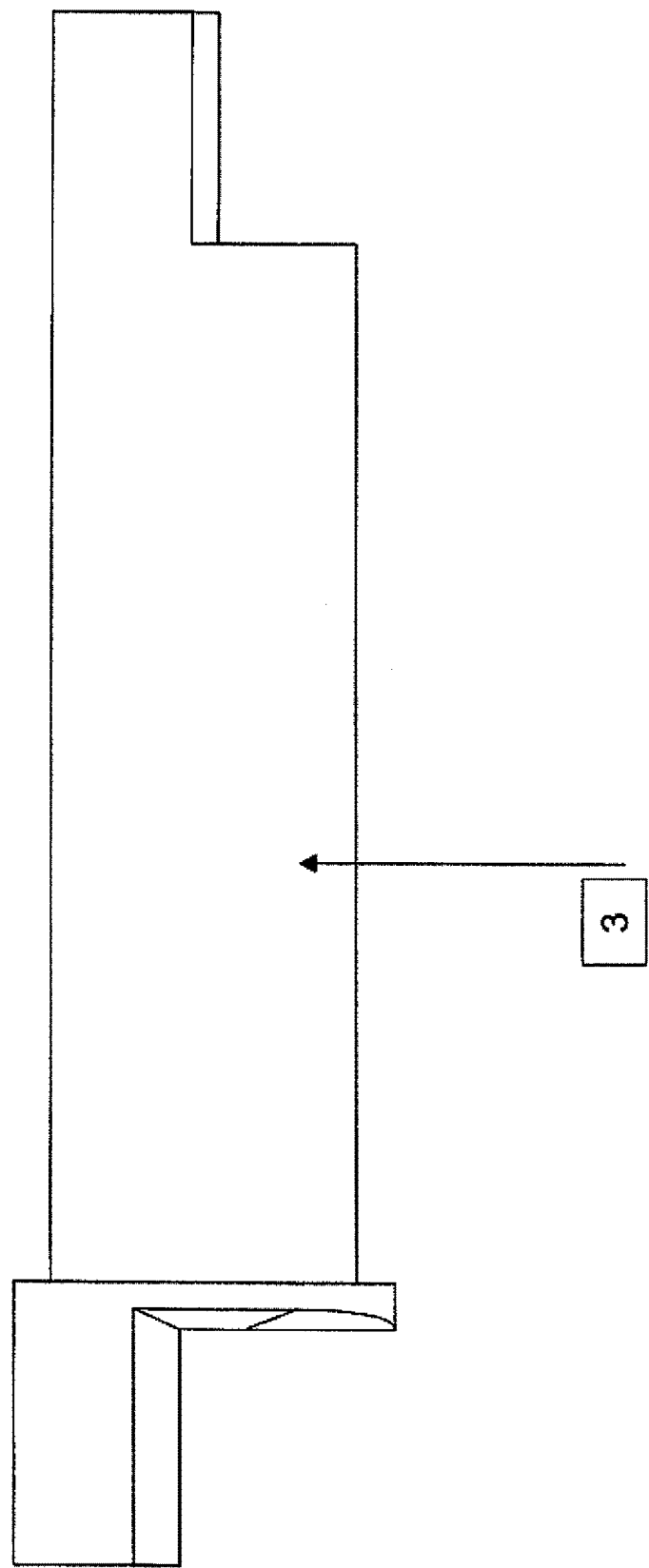
FIG. 6: a side view showing a clamping element of the stator vane assembly of FIG. 4.

FIGS. 4 through 6 show in a manner similar to FIGS. 1 through 3 a portion of a stator vane assembly of a compressor and a clamping element according to another embodiment of the present invention. Corresponding components are identified by the same reference numerals, so that only the differences will be discussed below. For other details, reference is made to the description hereinabove and hereinbelow.

As explained hereinabove, securement without axial play is accomplished in that clamping elements 3, when in the undeformed state, bear with their shoulder (on the left in FIG. 6) against a corresponding shoulder of the recess in inner ring end face 1.11, and therefore project beyond the same and into the through-holes in seal carrier end face 2.11, and that they are axially resiliently clamped when the inner ring and the seal carrier are rotated relative to each other from the mounting position shown in FIG. 4 to the end position shown in FIG. 5.

For radial securement, the seal carrier has two opposite parallel seal carrier peripheral surfaces 2.20, 2.21, as in the embodiment according to FIGS. 1 through 3. The inner ring has two inner ring peripheral surfaces 1.20, 1.21 which face said seal carrier peripheral surfaces. In the embodiment of FIGS. 4 through 6, the seal carrier peripheral surfaces are received between the inner ring peripheral surfaces with a radial gap therebetween. Conversely, in other embodiment, such as that described in International Patent Application WO 2007/134585, the inner ring peripheral surfaces may be received between the seal carrier peripheral surfaces with a radial gap therebetween.

In order to secure the seal carrier to the inner ring without radial play, clamping elements 3 are also radially resiliently clamped between the inner ring and the seal carrier, To this end, the clamping elements bear radially with a first clamping element peripheral surface, which in the exemplary embodiment is formed by the upper peripheral surface of the end portion of circular segment-shaped cross section on the left and/or that on the right in FIG. 6, against a counter peripheral surface of the inner ring, which in the exemplary embodiment is formed by a corresponding recess of circular segment-shaped cross section in the inner ring peripheral surface 1.20, and with a second clamping element peripheral surface, which in the exemplary embodiment is formed by the lower peripheral surface of the end portion of circular segment-shaped cross section on the left and/or that on the right in FIG. 6, against a counter peripheral surface of the seal carrier, which in the exemplary embodiment is formed by clamping element peripheral surface 2.20.

As can be seen especially in FIG. 4, the left and/or right end portions of clamping elements 3 have a circular segment-shaped cross section of less than 180°. The secant of this cross section has a bevel (on the right in FIG. 4) which forms an entry ramp against the radial direction.

Similar to the securement without axial play, the second clamping element peripheral surface, which is formed by this secant, radially projects beyond inner ring end face 1.21 when the clamping element is in the mounting position (see FIG. 4) in the undeformed; i.e., non-clamped, state. When the inner ring and the seal carrier are rotated into the end position (FIG. 5), the entry ramp slides against the radial direction onto the counter peripheral surface of seal carrier 2.20, and clamping element 3; i.e., its end portion on the left and/or that on the right in FIG. 6, is/are radially resiliently clamped.

Figure 7:
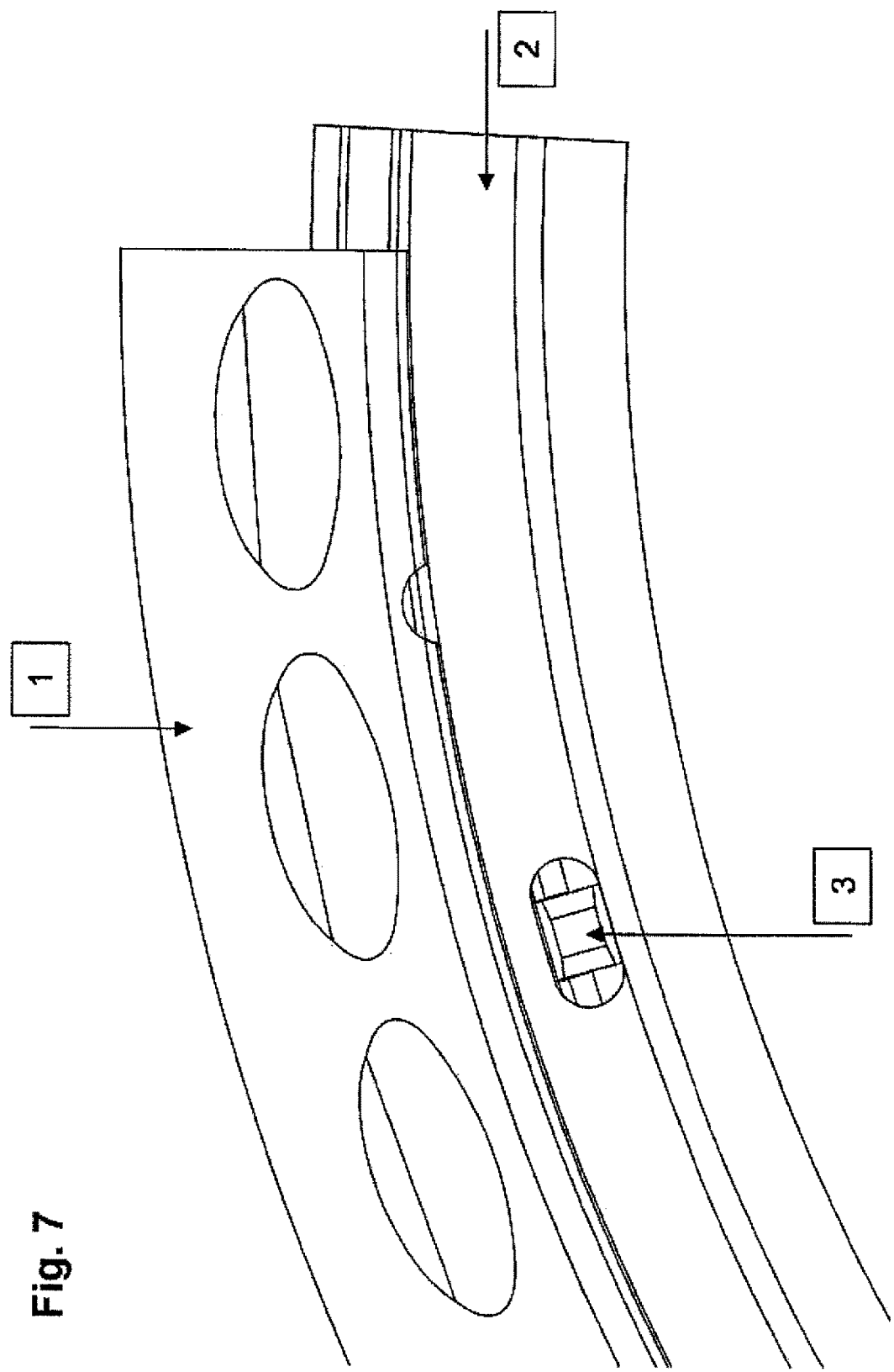
FIG. 7: a portion of a stator vane assembly of a compressor according to another embodiment of the present invention in a view similar to FIG. 1.
Figure 8:
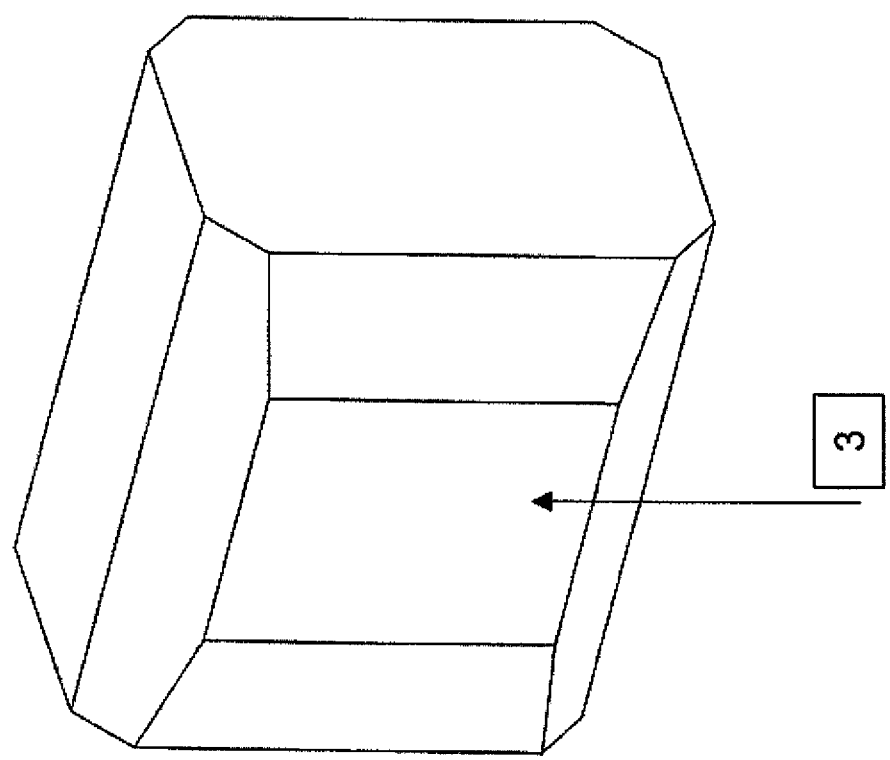
FIG. 8: a perspective view showing a clamping element of the stator vane assembly of FIG. 7.

FIGS. 7, 8 show in a manner similar to FIGS. 1 through 3 a portion of a stator vane assembly of a compressor and a clamping element according to another embodiment of the present invention. Corresponding components are identified by the same reference numerals, so that only the differences will be discussed below. For other details, reference is made to the description hereinabove and hereinbelow As can be seen especially in FIG. 8, the clamping elements 3 of this embodiment have a rectangular cross section in a plane normal to the axial direction. This allows them to be non-rotatably received in corresponding recesses in the inner ring. The through-holes in the seal carrier are configured correspondingly to allow the block-shaped clamping elements to be inserted into said recesses. Apart from that, the configuration and function are similar to the embodiment of FIGS. 1 through 3.

Figure 9:
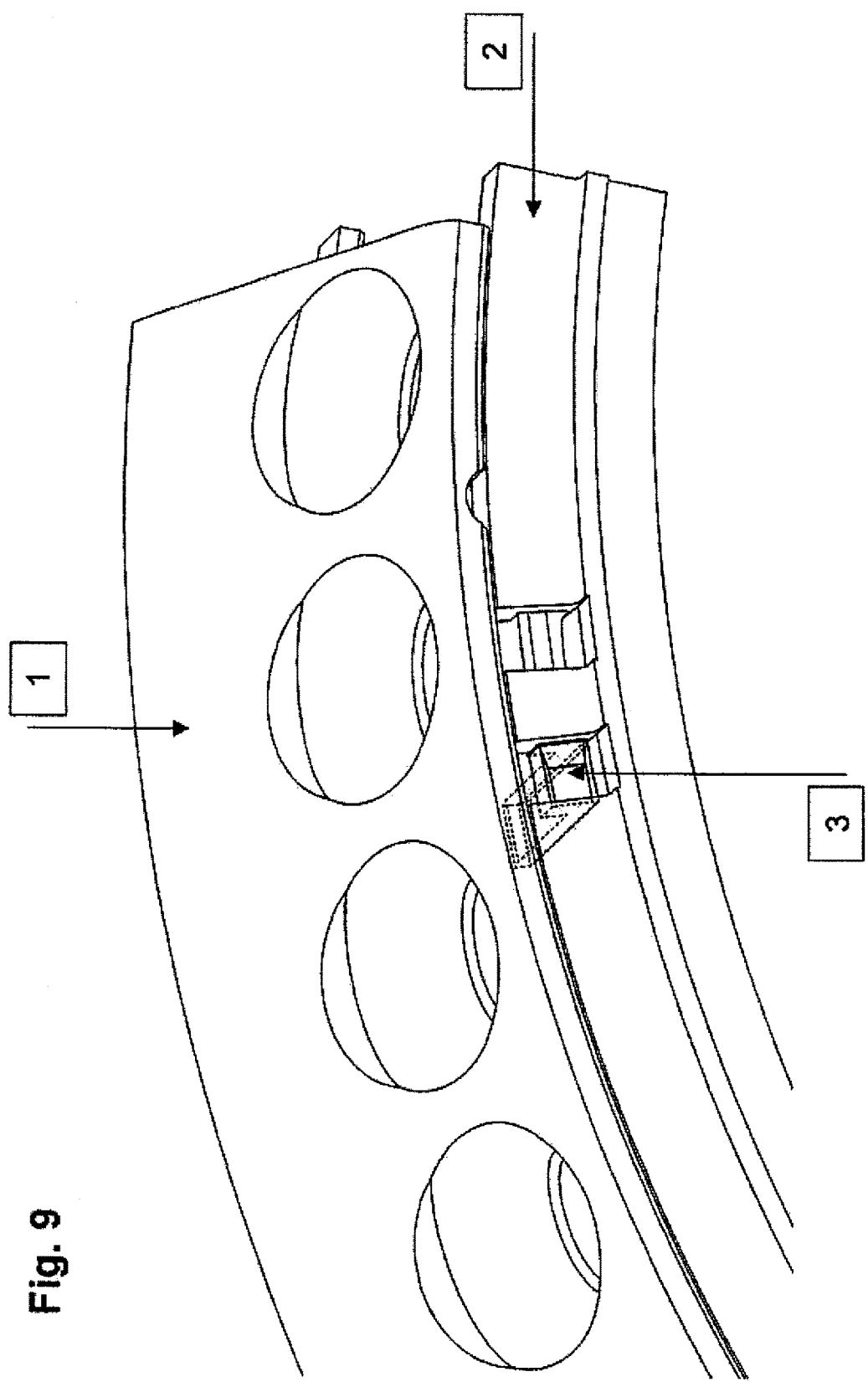
FIG. 9: a portion of a stator vane assembly of a compressor according to another embodiment of the present invention in a view similar to FIG. 4.
Figure 10:
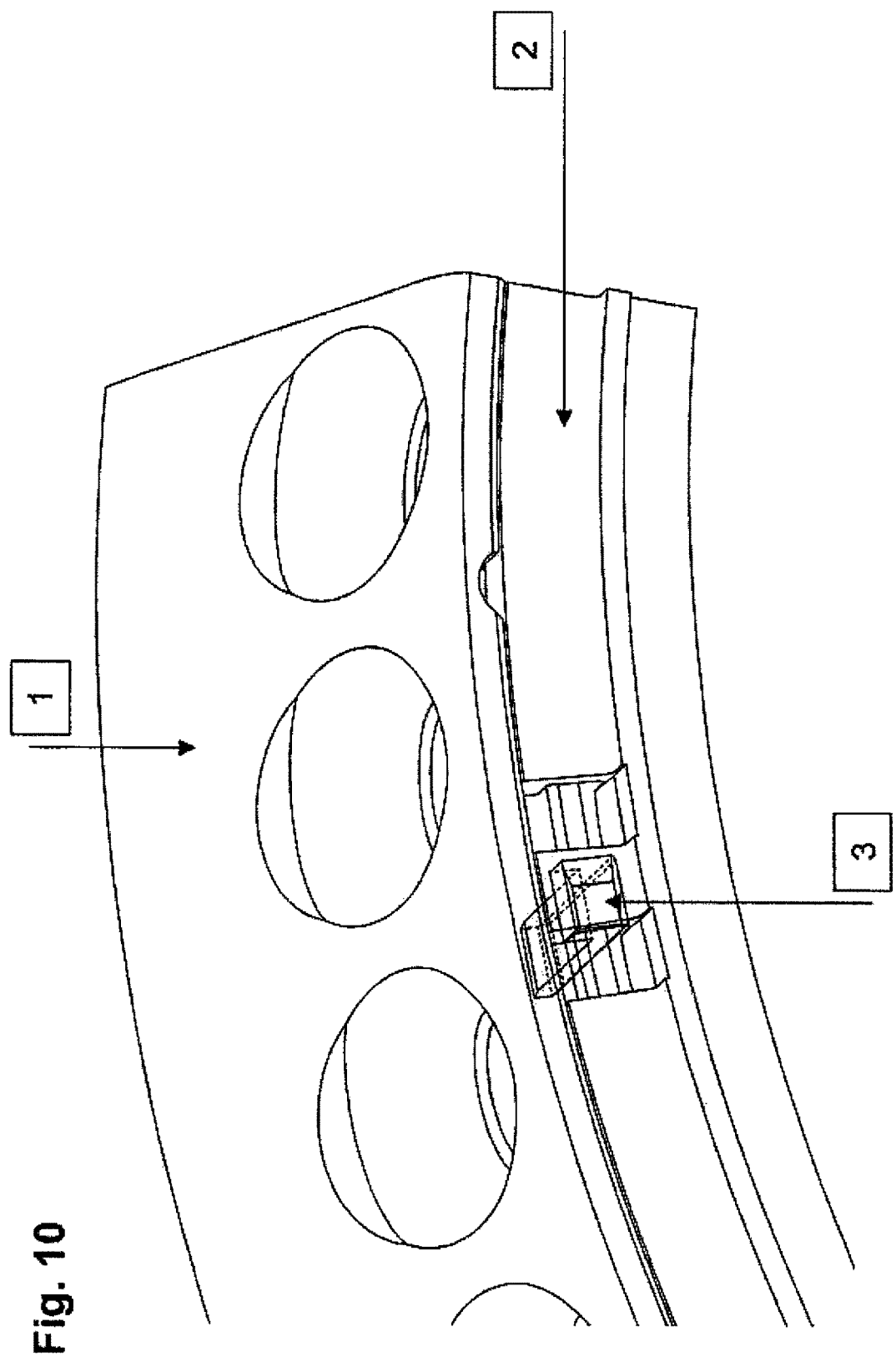
FIG. 10: the portion of the stator vane assembly of FIG. 9 in an end position which is rotated with respect to the mounting position and in which a seal carrier and an inner ring are secured to each other.
Figure 11:
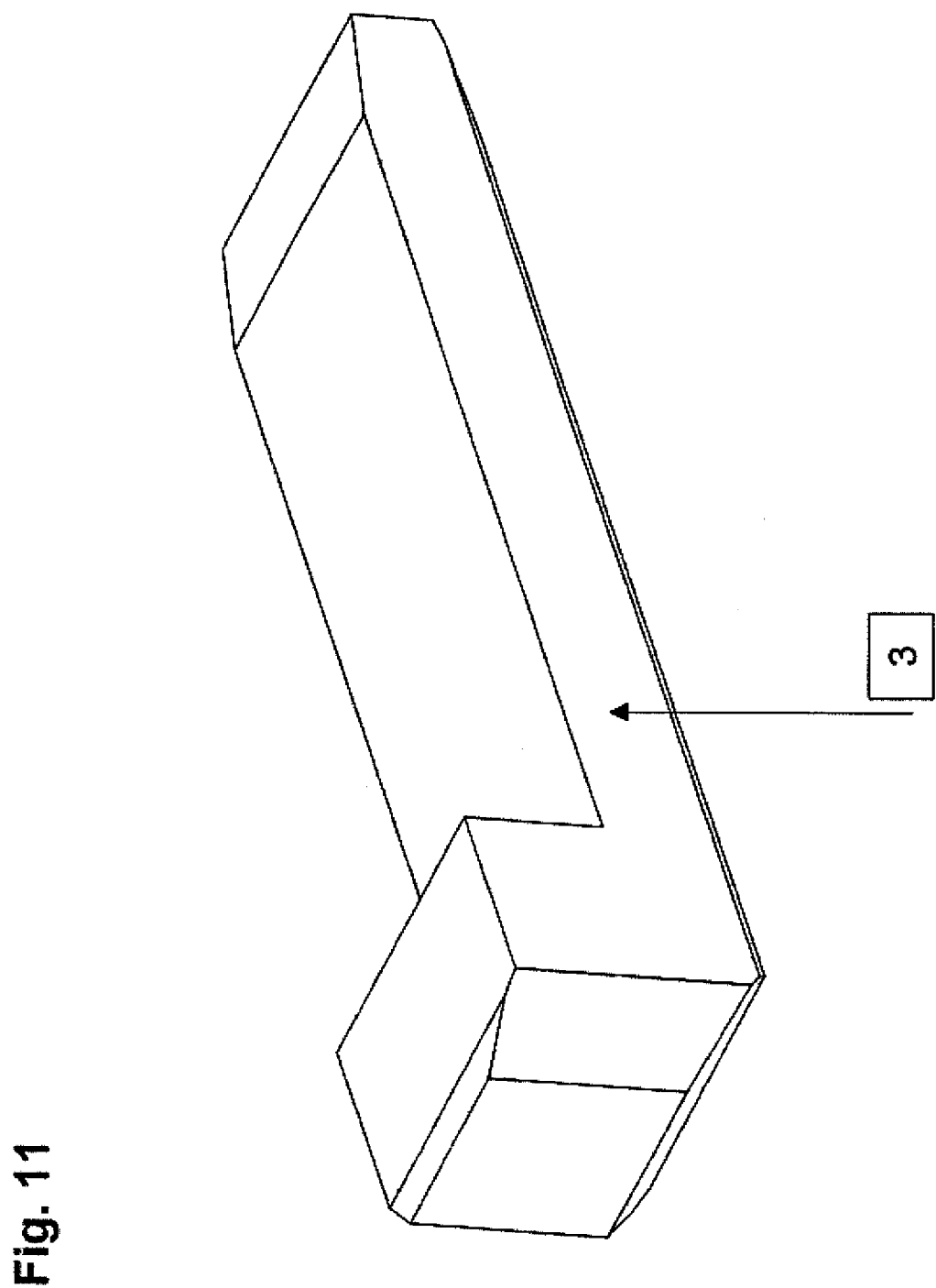
FIG. 11: a perspective view of a clamping element of the stator vane assembly of FIG. 1.

FIGS. 9 through 11 show in a manner similar to FIGS. 4 through 6 a portion of a stator vane assembly of a compressor and a clamping element according to another embodiment of the present invention. Corresponding components are identified by the same reference numerals, so that only the differences will be discussed below. For other details, reference is made to the description above.

As can be seen especially in FIG. 11, the clamping elements 3 of this embodiment have rectangular cross sections, as explained hereinabove with reference to FIG. 8. In addition, as explained with reference to FIG. 6, they have a shoulder, where a larger cross section changes into a smaller cross section. Bevels in the axial and radial directions on the larger end face (on the left in FIG. 11) and in the radial direction on the smaller end face (on the right in FIG. 11) form the entry ramp against the axial and radial directions, respectively.

In the mounting position (FIG. 9), the substantially L-shaped clamping elements 3 are inserted into correspondingly configured recesses in inner ring 1 through the through-holes in seal carrier 2 and are supported in said recesses in such a way that in the undeformed state, they project in the axial direction beyond an inner ring end face axially [sic] and in the radial direction beyond an inner ring peripheral surface. When they are rotated into the end position (FIG. 10), they are resiliently clamped in the axial direction by the seal carrier end face and/or counter end face 2.11 of seal carrier 2 and in the radial direction by the seal carrier peripheral surface and/or counter peripheral surface 2.20 of seal carrier 2. In this respect, the configuration and function are, in particular, similar to the embodiment of FIGS. 4 through 6.

Figure 12:
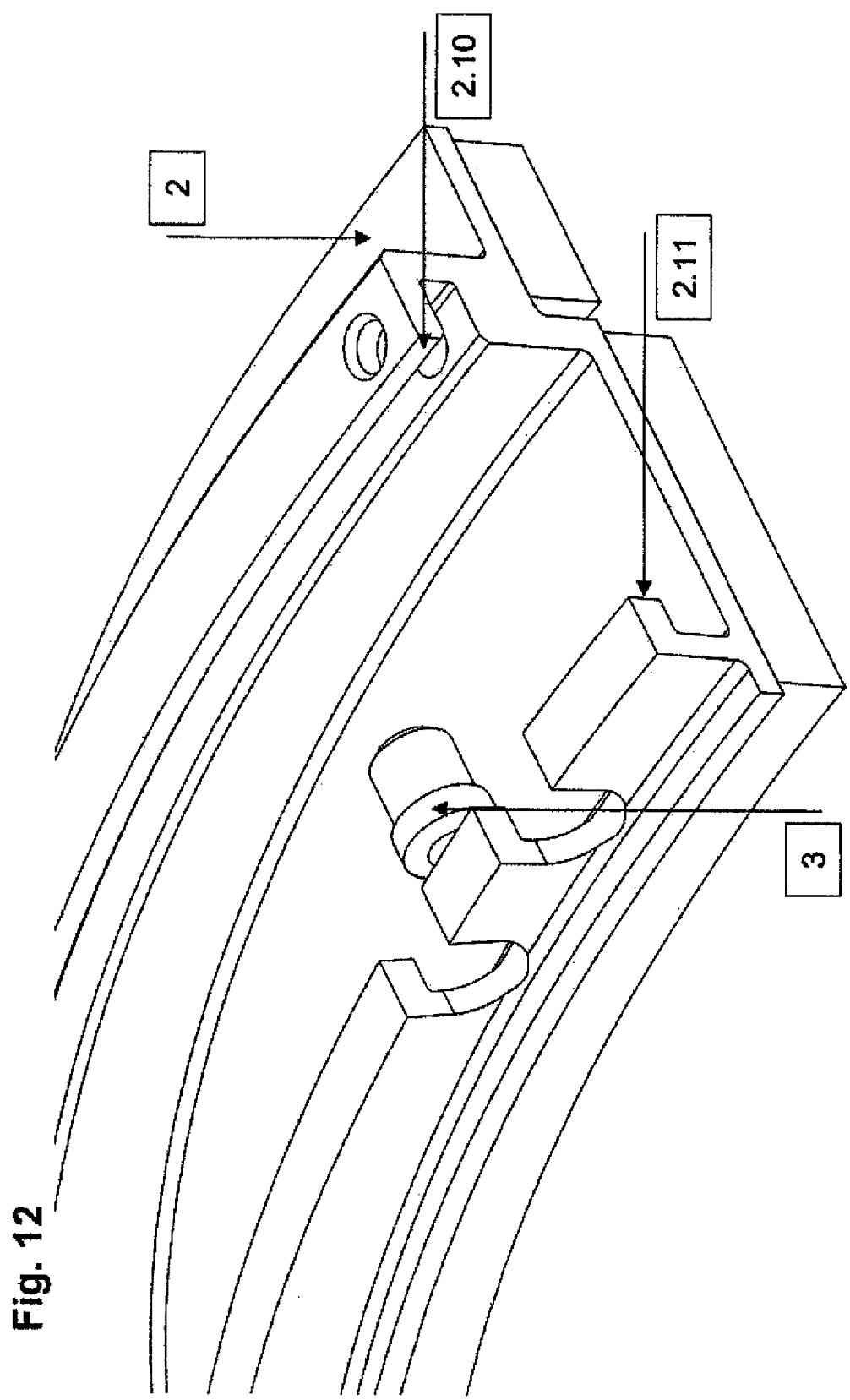
FIG. 12: the portion of the stator vane assembly of the compressor in a perspective view.
Figure 13:
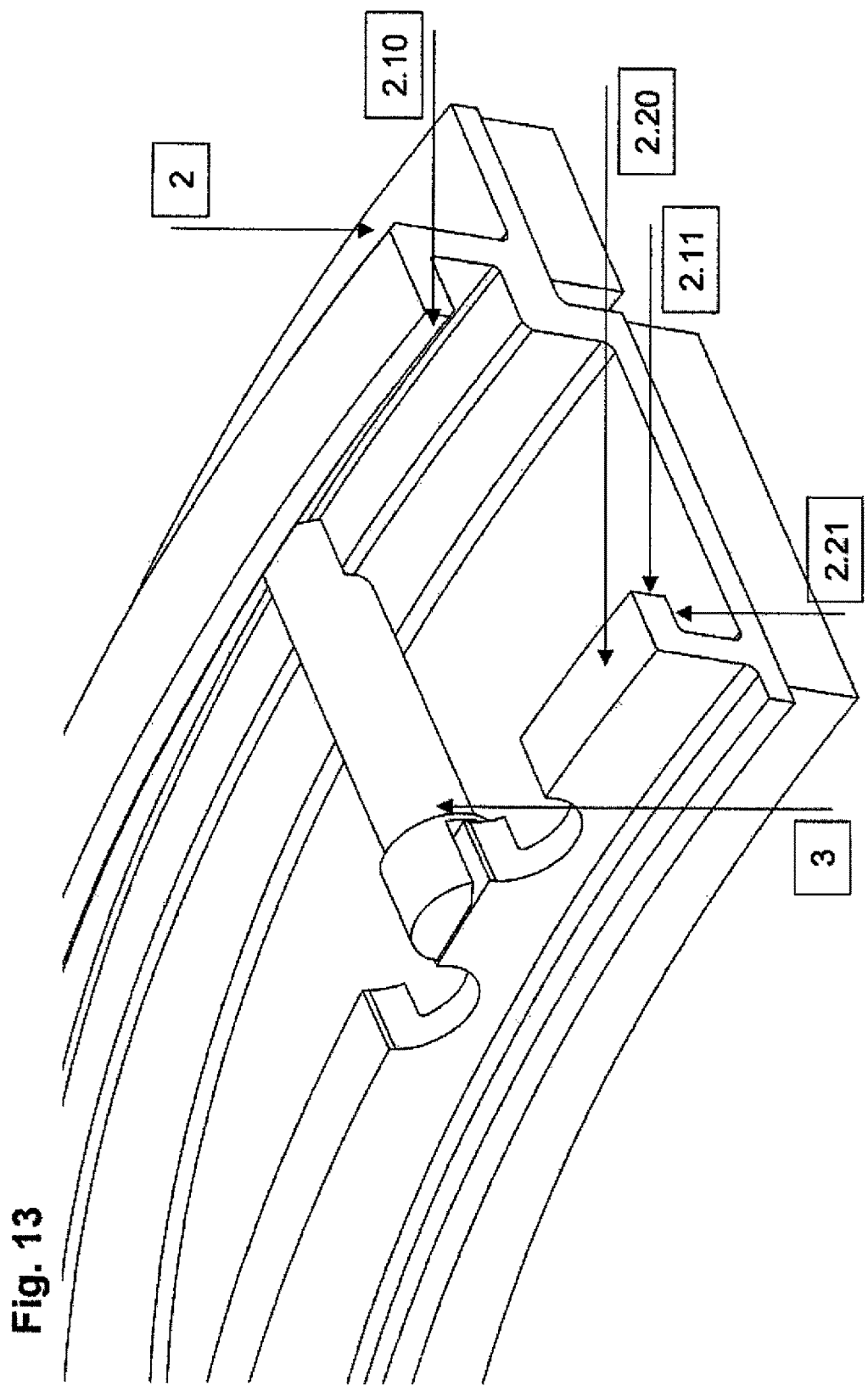
FIG. 13: a perspective view showing the portion of the stator vane assembly of the compressor according to FIG. 5.
Figure 14:
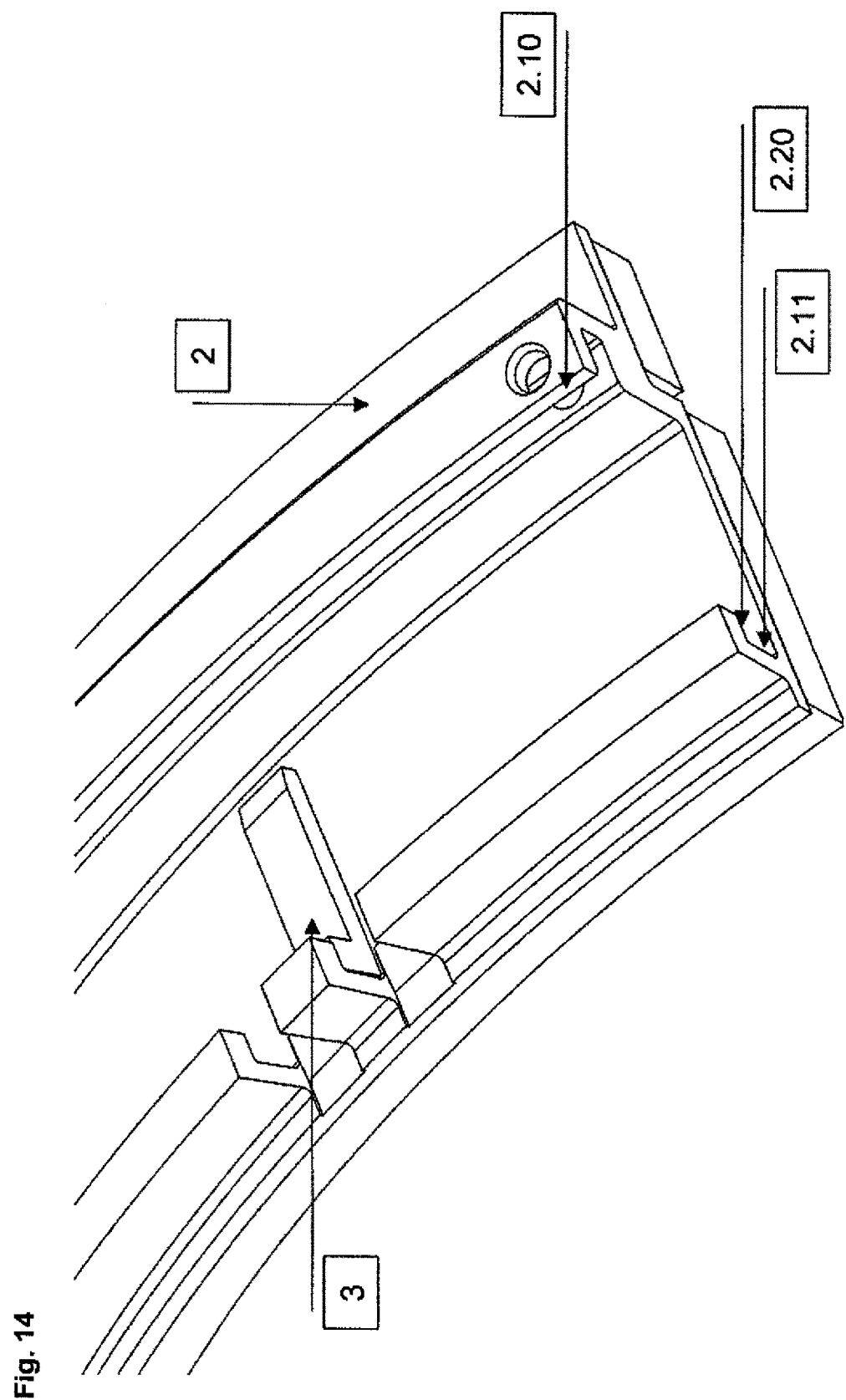
FIG. 14: a perspective view showing the portion of the stator vane assembly according to FIG. 10.

FIG. 12 once again shows the portion of the stator vane assembly of the compressor according to FIG. 1 in the end position, which is rotated relative to the mounting position. Analogously, FIG. 13 once again shows the portion of the stator vane assembly of the compressor according to FIG. 5, and FIG. 14 shows the portion of the stator vane assembly according to FIG. 10. In each case, the inner ring has been omitted for reasons of clarity.

LIST OF REFERENCE NUMERALS

1 inner ring
1.10, 1.11 inner ring end face
1.20, 1.21 inner ring peripheral surface
2 seal carrier
2.10, 2.11 seal carrier end face
2.20, 2.21 seal carrier peripheral surface
3 clamping element

What is claimed is:

1. A compressor comprising:
    a stator vane assembly having an inner ring and a seal carrier secured thereto, the seal carrier having two opposite seal carrier end faces and the inner ring having two inner ring end faces which face said seal carrier end faces and are received between said seal carrier end faces with an axial gap therebetween, and
    at least one clamping element which bears axially with a first clamping element end face against the inner ring and with a second clamping element end face against the seal carrier and which is axially resiliently clamped between the inner ring and the seal carrier.

2. The compressor as recited in claim 1 wherein at least one of the first and second clamping element end faces has an entry ramp against the axial direction.

3. The compressor as recited in claim 1 wherein the clamping element is partially received within a recess in an inner ring end face and/or an inner ring peripheral surface.

4. The compressor as recited in claim 1 wherein the seal carrier is secured to the inner ring in a position that is rotated with respect to the mounting position; and a seal carrier end face has a through-hole for insertion of the clamping element into the recess which, in the mounting position, is in alignment with the through-hole.

5. The compressor as recited in claim 1 wherein the clamping element has a shoulder.

6. The compressor as recited in claim 1 wherein the clamping element has a circular or rectangular cross section.

7. An aircraft engine comprising the compressor as recited in claim 1.

8. A compressor as recited in claim 1 comprising:
    the seal carrier having two opposite seal carrier peripheral surfaces and the inner ring having two inner ring peripheral surfaces which face said seal carrier peripheral surfaces; ones of the seal carrier peripheral surfaces and of the inner ring peripheral surfaces being received between the other ones of the seal carrier peripheral surfaces and of the inner ring peripheral surfaces with a radial gap therebetween; and
    wherein the at least one clamping element bears radially with a first clamping element peripheral surface against the inner ring and with a second clamping element peripheral surface against the seal carrier and which is radially resiliently clamped between the inner ring and the seal carrier.

9. A compressor comprising:
    a stator vane assembly having an inner ring and a seal carrier secured thereto, the seal carrier having two opposite seal carrier peripheral surfaces and the inner ring having two inner ring peripheral surfaces which face said seal carrier peripheral surfaces; ones of the seal carrier peripheral surfaces and of the inner ring peripheral surfaces being received between the other ones of the seal carrier peripheral surfaces and of the inner ring peripheral surfaces with a radial gap therebetween; and at least one clamping element which bears radially with a first clamping element peripheral surface against the inner ring and with a second clamping element peripheral surface against the seal carrier and which is radially resiliently clamped between the inner ring and the seal carrier.

10. The compressor as recited in claim 9 wherein at least one of the first and second clamping element peripheral surfaces has an entry ramp against the radial direction.

11. The compressor as recited in claim 9 wherein the clamping element is partially received within a recess in an inner ring end face and/or an inner ring peripheral surface.

12. The compressor as recited in claim 9 wherein the seal carrier is secured to the inner ring in a position that is rotated with respect to the mounting position; and a seal carrier end face has a through-hole for insertion of the clamping element into the recess which, in the mounting position, is in alignment with the through-hole.

13. The compressor as recited in claim 9 wherein the clamping element has a shoulder.

14. The compressor as recited in claim 9 wherein the clamping element has a circular or rectangular cross section.

15. An aircraft engine comprising the compressor as recited in claim 9.

16. A method for securing the seal carrier to the inner ring of a compressor as recited in claim 1 wherein the clamping element is resiliently clamped between the seal carrier and the inner ring.

17. The method as recited in claim 16 wherein in a mounting position, the clamping element is partially inserted into a recess of an inner ring end face through a through-hole in a seal carrier end face, whereupon the seal carrier and the inner ring are rotated relative to each other and secured to each other, thereby resiliently clamping the clamping element between the seal carrier and the inner ring.

18. A method for securing the seal carrier to the inner ring of a compressor as recited in claim 9 wherein the clamping element is resiliently clamped between the seal carrier and the inner ring.

19. The method as recited in claim 18 wherein in a mounting position, the clamping element is partially inserted into a recess of an inner ring end face through a through-hole in a seal carrier end face, whereupon the seal carrier and the inner ring are rotated relative to each other and secured to each other, thereby resiliently clamping the clamping element between the seal carrier and the inner ring.

20. An inner ring for a compressor as recited in claim 1.

21. An inner ring for a compressor as recited in claim 9.

22. A seal carrier for a compressor as recited in claim 1.

23. A seal carrier for a compressor as recited in claim 9.

24. A clamping element for a compressor as recited in claim 1.

25. A clamping element for a compressor as recited in claim 9.

* * * * *